United States Patent
Jung

(10) Patent No.: US 9,898,045 B2
(45) Date of Patent: Feb. 20, 2018

(54) CURVED DISPLAY APPARATUS

(71) Applicant: SAMSUNG DISPLAY CO., LTD., Yongin-si, Gyeonggi-do (KR)

(72) Inventor: Hyung Gi Jung, Cheonan-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 13 days.

(21) Appl. No.: 15/134,177

(22) Filed: Apr. 20, 2016

(65) Prior Publication Data

US 2016/0327985 A1 Nov. 10, 2016

(30) Foreign Application Priority Data

May 8, 2015 (KR) ........................ 10-2015-0064794

(51) Int. Cl.
*G06F 1/16* (2006.01)
*G02F 1/13* (2006.01)
*G02F 1/1333* (2006.01)

(52) U.S. Cl.
CPC ...... *G06F 1/1637* (2013.01); *G02F 1/133308* (2013.01); *G06F 1/1601* (2013.01); *G06F 1/1626* (2013.01); *G06F 1/1652* (2013.01); *G06F 2200/1612* (2013.01)

(58) Field of Classification Search
CPC ............. G02F 1/1333; G02F 1/133305; G06F 1/1652; H01L 51/0097; H01L 2251/5338; Y10T 156/1002; Y10T 156/1028; Y10T 156/103

See application file for complete search history.

(56) References Cited

U.S. PATENT DOCUMENTS

| | | | | |
|---|---|---|---|---|
| 3,904,467 A | * | 9/1975 | Srail | ........................ B29C 53/04 156/229 |
| 5,273,475 A | * | 12/1993 | Oshikawa | ......... G02F 1/133305 156/163 |
| 5,307,190 A | * | 4/1994 | Wakita | .............. G02F 1/133305 349/153 |
| 6,332,690 B1 | * | 12/2001 | Murofushi | ........ G02F 1/133305 349/64 |
| 6,654,071 B2 | * | 11/2003 | Chen | ........................ G06F 3/044 345/104 |
| 6,859,251 B2 | * | 2/2005 | Wang | .................... G02F 1/1339 349/158 |
| 7,060,591 B2 | * | 6/2006 | Yamazaki | ......... G02F 1/133305 257/E21.122 |
| 9,483,964 B2 | * | 11/2016 | Choi | ........................ G09F 9/30 |
| 2002/0003711 A1 | * | 1/2002 | Hashimoto | .......... G02B 6/0028 362/551 |

(Continued)

FOREIGN PATENT DOCUMENTS

| KR | 1020050085066 | 8/2005 |
|---|---|---|
| KR | 1020050089236 | 9/2005 |

(Continued)

*Primary Examiner* — Adrian S Wilson
(74) *Attorney, Agent, or Firm* — F. Chau & Associates, LLC

(57) ABSTRACT

A curved display apparatus includes an upper panel, a lower panel coupled to a lower portion of the upper panel, and a first stress reducing layer deposited on a panel facing surface of at least one of the upper panel and the lower panel to generate a force which bends the upper panel or the lower panel downward.

16 Claims, 18 Drawing Sheets

(56) References Cited

U.S. PATENT DOCUMENTS

| | | | | |
|---|---|---|---|---|
| 2003/0113551 | A1* | 6/2003 | Thomsen | B32B 17/10036 428/435 |
| 2006/0098153 | A1* | 5/2006 | Slikkerveer | G02F 1/133305 349/187 |
| 2006/0216909 | A1* | 9/2006 | Yamazaki | G02F 1/133305 438/457 |
| 2006/0273304 | A1* | 12/2006 | Cok | H01L 51/0096 257/40 |
| 2012/0249465 | A1* | 10/2012 | Lin | G06F 3/041 345/173 |
| 2012/0320509 | A1* | 12/2012 | Kim | B32B 17/064 361/679.01 |
| 2013/0180653 | A1* | 7/2013 | Kim | G02F 1/133305 156/257 |
| 2014/0045283 | A1* | 2/2014 | Hirakata | H01L 51/56 438/22 |

FOREIGN PATENT DOCUMENTS

| | | |
|---|---|---|
| KR | 1020060060993 | 6/2006 |
| KR | 1020080048726 | 6/2008 |
| KR | 1020090066658 | 6/2009 |
| KR | 1020110100537 | 9/2011 |
| KR | 101113734 | 2/2012 |

* cited by examiner

CURVED DISPLAY APPARATUS

CROSS-REFERENCE TO RELATED APPLICATION

This application claims priority from and the benefit of Korean Patent Application No. 10-2015-0064794, filed in the Korean Intellectual Property Office on May 8, 2015, the contents of which are herein incorporated by reference in their entirety.

BACKGROUND (a) Field

Embodiments of the present disclosure are directed to a curved display apparatus, and more particularly, to a curved display apparatus of which the screen is bent.

(b) Description of the Related Art

A display apparatus is a device that displays an image signal. Examples of a display apparatus include a television, a computer monitor, a personal digital assistant (PDA), a smart device, etc., and includes all devices which display an externally received image signal.

Among display apparatuses, a curved display apparatus having a bent form, rather than a flat form, has been recently developed to improve viewer immersion. A curved display apparatus is made by manufacturing an upper panel and a lower panel of a flat display apparatus, respectively, bonding the upper and lower panels with a seal, and then bending the flat panel into a desired curvature with radius R. Viewer immersion may be increased by bending the panel as described above.

However, to improve viewer immersion, the curvature radius of the curved display apparatus may be reduced. However, excessive bending of the panel may increase fatigue of the upper and lower panels, thereby causing the panel to break after long time lapse.

Further, since the panel may return to an initial flat state, stress applied to the seal increases. For this reason, a bonding force applied by the seal between the upper and lower panels may be limited, which may cause lifting of the upper and lower panels or leakage of liquid crystal within a short period of time, such that the panel may be vulnerable to moisture absorption or other impacts.

SUMMARY

Embodiments of the present disclosure can provide a curved display apparatus that can reduce stress in the curved display apparatus.

An exemplary embodiment provides a curved display apparatus that includes an upper panel, a lower panel coupled to a lower portion of the upper panel, a first stress reducing layer deposited on a panel-facing surface of at least one of the upper panel and the lower panel to generate a force that bends the upper panel or the lower panel downward.

Another embodiment provides a curved display apparatus that includes an upper panel, a lower panel coupled to a lower portion of the upper panel, a second stress reducing layer deposited on an outward-facing surface of at least one of the upper panel and the lower panel to generate a force that depresses the upper panel or the lower panel downward.

Yet another embodiment provides a curved display apparatus that includes an upper panel, a lower panel coupled to a lower portion of the upper panel, a first stress reducing layer deposited on a lower surface of at least one of the upper panel and the lower panel to generate a force that bends the upper panel and the lower panel downward; and a second stress reducing layer deposited on an upper surface of at least one of the upper panel and the lower panel to generate a force that depresses the upper panel and the lower panel downward.

The first stress reducing layer may be deposited at a first deposition speed, and the first deposition speed may be greater than or equal to 70 Å/sec.

The second stress reducing layer may be deposited at a second deposition speed, and the second deposition speed may be less than or equal 20 Å/sec.

Each of the first stress reducing layer and the second stress reducing layer may be deposited with a reaction gas and the reaction gas may be a mixture of ammonia $NH_3$, monosilane $SiH_4$, and nitrogen $N_2$.

The curved display apparatus may include the first stress reducing layer or the second stress reducing layer. According to an exemplary embodiment of the present disclosure, the first stress reducing layer or the second stress reducing layer can maintain a bent state and thus reduce the tendency of the upper and lower panels to return to a flat state. As a result, it is possible to reduce stress applied to the seal bonding between the upper and lower panels to prevent lifting of the upper and lower panels or leakage of the liquid crystal material from occurring.

DETAILED DESCRIPTION OF EXEMPLARY EMBODIMENTS

Figure 1:
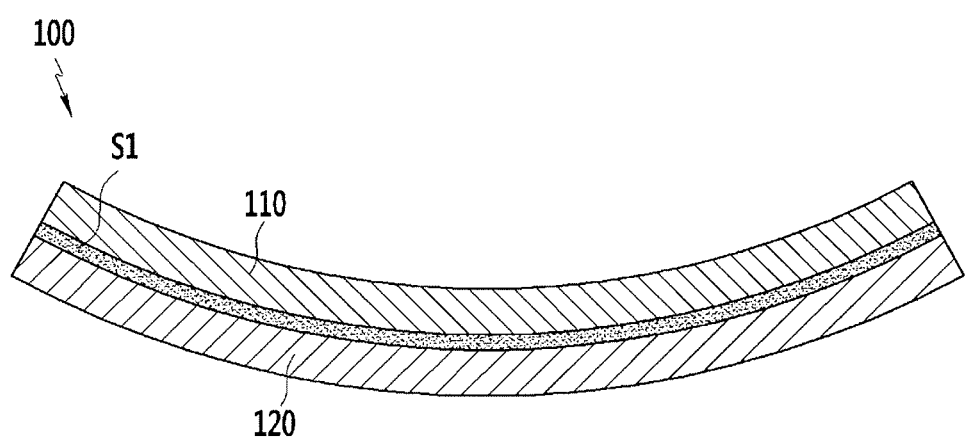
FIG. 1 illustrates a curved display apparatus according to an exemplary embodiment of the present disclosure.

Hereinafter, embodiments of the present disclosure will be described more fully hereinafter with reference to the accompanying drawings, in which exemplary embodiments of the disclosure are shown. As those skilled in the art would realize, the exemplary embodiments may be modified in various different ways, all without departing from the spirit or scope of the present disclosure.

Accordingly, the drawings and description are to be regarded as illustrative in nature and not restrictive. Like reference numerals may designate like elements throughout the specification.

In addition, in several exemplary embodiments, components having the same configuration may be representatively described using the same reference numerals in an exemplary embodiment, and components different from those of an exemplary embodiment will be described in the other exemplary embodiments.

FIG. 1 illustrates a curved display apparatus according to an exemplary embodiment of the present disclosure.

Referring to FIG. 1, a curved display apparatus 100 according to an exemplary embodiment includes an upper panel 110 and a lower panel 120 coupled to a lower portion of the upper panel 110.

The upper panel 110 and the lower panel 120 may be spaced apart from each other. The upper panel 110 and the lower panel 120 may be bonded to each other by a sealant which is discharged along edges thereof. A space formed by the sealant may be injected with a liquid crystal. The upper panel 110 and the lower panel 120 are typical of those included in a liquid crystal display and therefore a detailed description thereof will be omitted.

Here, the curved display apparatus 100 according to an exemplary embodiment includes a first stress reducing layer S1.

The first stress reducing layer S1 is deposited on a panel-facing surface of at least one of the upper panel 110 and the lower panel 120 at a first deposition speed to generate a force which makes the upper panel 110 and the lower panel 120 bend downward. In detail, the first stress reducing layer S1 can be formed on a lower surface of the upper panel 110 or an upper surface of the lower panel 120.

The first stress reducing layer S1 generates a force which makes the upper panel 110 and the lower panel 120 bend downward. For this purpose, the first deposition speed at which the first stress reducing layer S1 is formed may be greater than or equal to about 70 Å/sec. Here, a maximum value of the first deposition speed may vary depending on design and therefore the maximum value is not limited.

Figure 2:
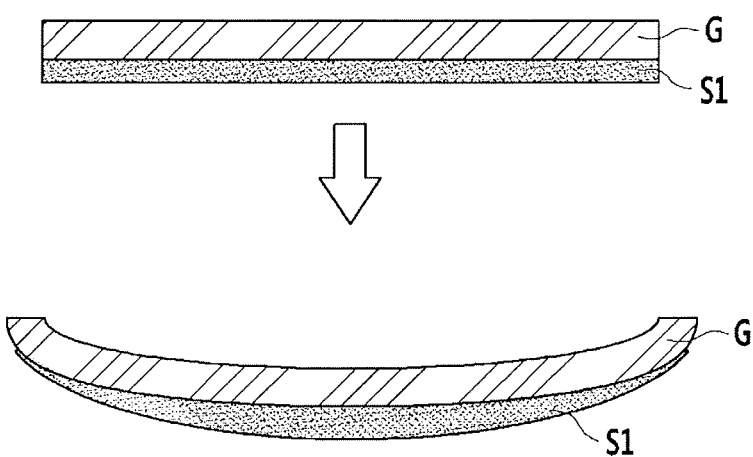
FIG. 2 illustrates an object in which a first stress reducing layer is formed.

FIG. 2 illustrates an object in which a first stress reducing layer is formed.

Referring to FIG. 2, a tissue of the first stress reducing layer S1 is less dense when the first stress reducing layer S1 is formed on one surface of a plate-like object G at the first deposition speed, thus bending the surface on which the first stress reducing layer S1 is formed. Therefore, the first stress reducing layer S1 applies a force to the object G. That is, a force may be generated from the first stress reducing layer S1 to bend the surface on which the first stress reducing layer S1 is formed.

Figure 3:
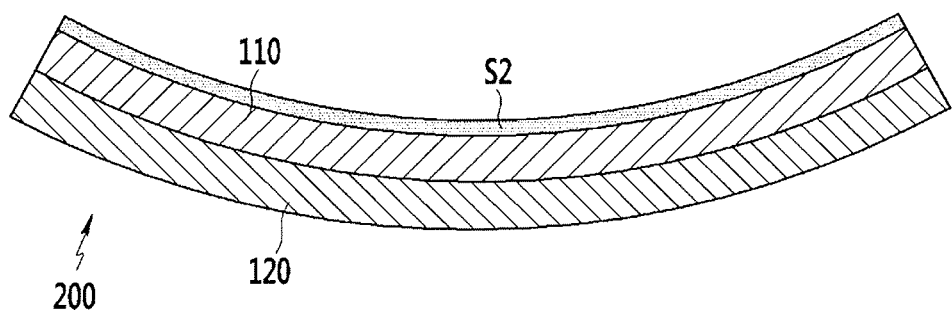
FIG. 3 illustrates a curved display apparatus according to an exemplary embodiment of the present disclosure.

FIG. 3 illustrates a curved display apparatus according to an exemplary embodiment of the present disclosure.

Referring to FIG. 3, a curved display apparatus 200 according to an exemplary embodiment includes a second stress reducing layer S2.

The second stress reducing layer S2 is deposited on an outward facing surface of any one of the upper panel 110 and the lower panel 120, i.e., a surface faces away from the other panel, at a second deposition speed to generate a force which makes the upper panel 110 or the lower panel 120 bend downward. In detail, the second stress reducing layer S2 can be formed on either the upper surface of the upper panel 110 or the lower surface of the lower panel 120. Further, the second stress reducing layer S2 may also be formed on the upper surface of the upper panel 110 and the lower surface of the lower panel 120.

The second stress reducing layer S2 generates a force which makes the upper panel 110 and the lower panel 120 bend downward. For this purpose, a second deposition speed at which the second stress reducing layer S2 is formed may be less than or equal to about 20 Å/sec.

Figure 4:
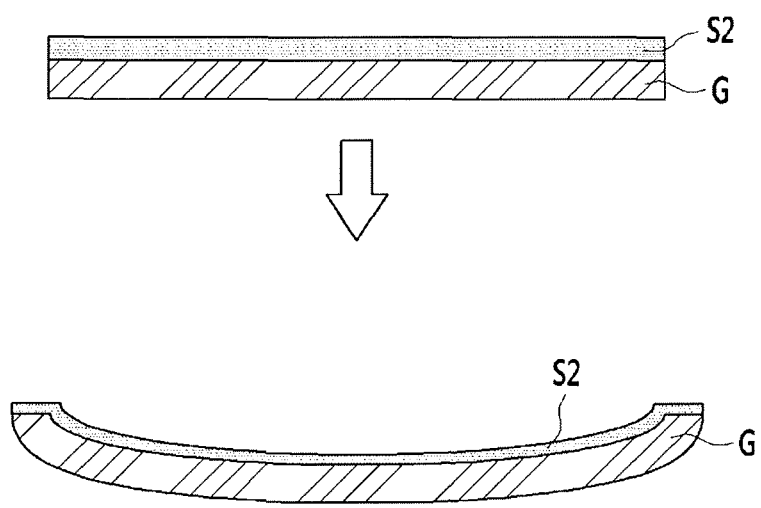
FIG. 4 illustrates an object in which a second stress reducing layer is formed.

FIG. 4 illustrates an object in which the second stress reducing layer is formed.

Referring to FIG. 4, a tissue of the second stress reducing layer S2 is more densely formed when the second stress reducing layer S2 is formed on one surface of the plate-like object G at the second deposition speed, and thus depressing the surface on which the second stress reducing layer S2 is formed. Therefore, the second stress reducing layer S2 applies a force to the object. That is, a force may be generated from the second stress reducing layer S2 to depress the surface on which the second stress reducing layer S2 is formed.

Figure 5:
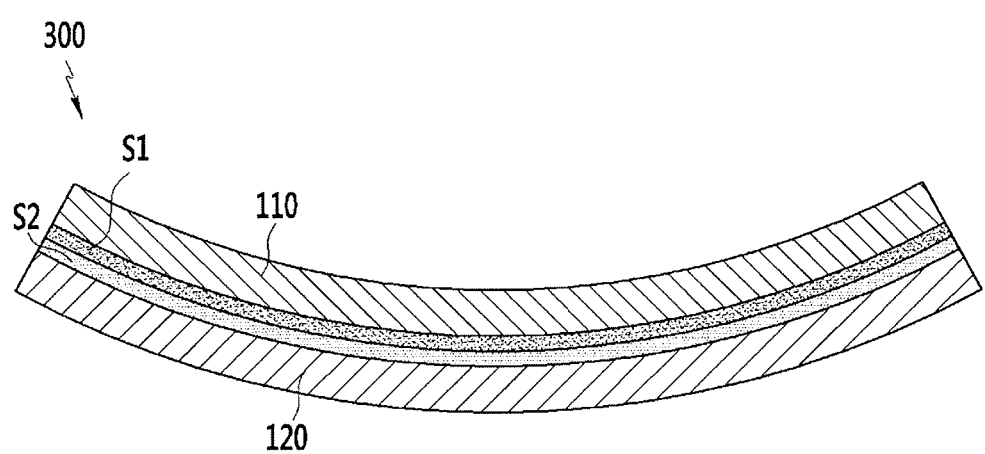
FIG. 5 illustrates a curved display apparatus according to an exemplary embodiment of the present disclosure.

FIG. 5 illustrates a curved display apparatus according to an exemplary embodiment of the present disclosure.

Referring to FIG. 5, a curved display apparatus 300 according to an exemplary embodiment includes the first stress reducing layer S1 and the second stress reducing layer S2 described above.

The foregoing structures include one stress reducing layer. However, the curved display apparatus 300 according to an exemplary embodiment includes both the first stress reducing layer S1 and the second stress reducing layer S2 to more stably apply a force to the upper panel 110 and the lower panel 120.

In addition, each of the first stress reducing layer S1 and the second stress reducing layer S2 can be deposited with a reaction gas. According to an embodiment, the reaction gas includes a mixture of ammonia $NH_3$, monosilane $SiH_4$, and nitrogen $N_2$.

Various structures of a curved display apparatus on which the first stress reducing layer S1 or the second stress reducing layer S2 is formed will be described below.

Figure 6A:
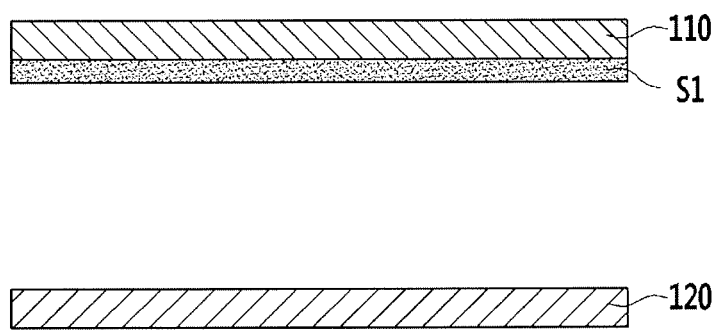
FIGS. 6A to 6C illustrate examples in which the first stress reducing layer or the second stress reducing layer is formed on an upper panel in a curved display apparatus according to an exemplary embodiment of the present disclosure.
Figure 6B:
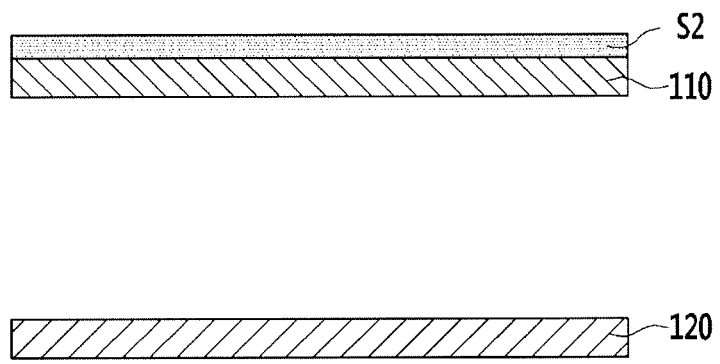
Figure 6C:
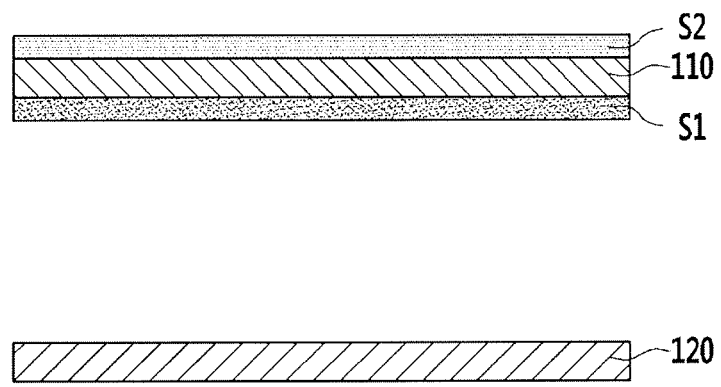

FIGS. 6A to 6C illustrate examples in which the first stress reducing layer or the second stress reducing layer is formed on the upper panel in a curved display apparatus according to an exemplary embodiment of the present disclosure.

As illustrated in FIG. 6A, according to an embodiment, the first stress reducing layer S1 is formed on the lower surface of the upper panel 110.

As illustrated in FIG. 6B, according to an embodiment, the second stress reducing layer S2 is formed on the upper surface of the upper panel 110.

As illustrated in FIG. 6C, according to an embodiment, the first stress reducing layer S1 is formed on the lower surface of the upper panel 110 and the second stress reducing layer S2 is formed on the upper surface of the upper panel 110.

Figure 7A:
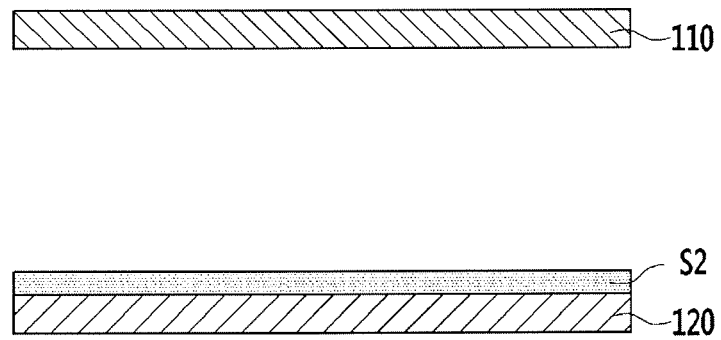
FIGS. 7A to 7C illustrate examples in which the first stress reducing layer or the second stress reducing layer is formed on a lower panel in a curved display apparatus according to an exemplary embodiment of the present disclosure.
Figure 7B:
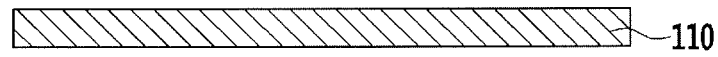
Figure 7B:
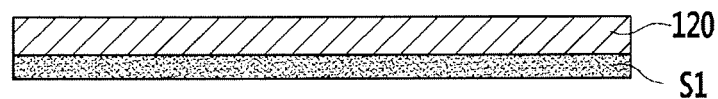
Figure 7C:
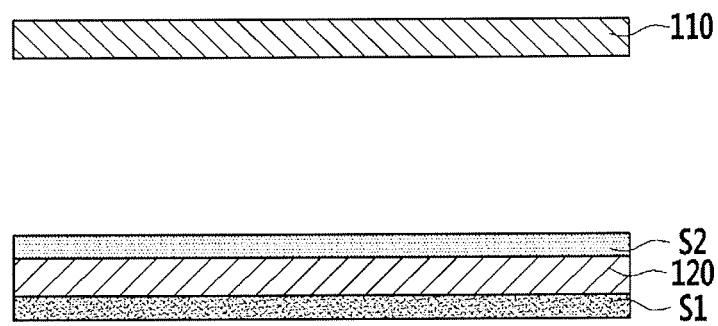

FIGS. 7A to 7C illustrate examples in which the first stress reducing layer or the second stress reducing layer is formed on the lower panel in a curved display apparatus according to an exemplary embodiment of the present disclosure.

As illustrated in FIG. 7A, according to an embodiment, the second stress reducing layer S2 is formed on the upper surface of the lower panel 120.

As illustrated in FIG. 7B, according to an embodiment, the first stress reducing layer S1 is formed on the lower surface of the lower panel 120.

In FIG. 7C, according to an embodiment, the second stress reducing layer S2 is formed on the upper surface of the lower panel 120 and the first stress reducing layer S1 is formed on the lower surface of the lower panel 120.

FIGS. 8A to 8G illustrate examples in which the first stress reducing layer or the second stress reducing layer is formed on the upper panel, and the first stress reducing layer or the second stress reducing layer is formed on the lower panel, in a curved display apparatus according to an exemplary embodiment of the present disclosure.

Figure 8A:
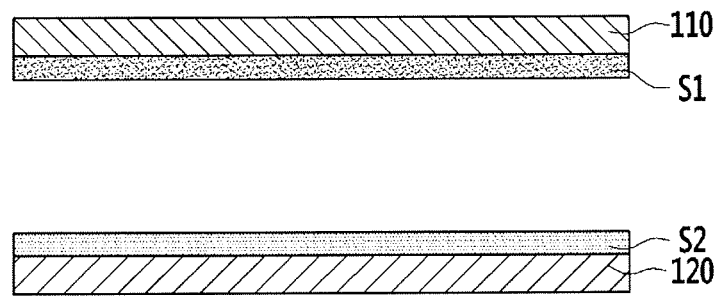
FIGS. 8A to 8G illustrate examples in which the first stress reducing layer or the second stress reducing layer is formed on the upper panel and the first stress reducing layer or the second stress reducing layer is formed on the lower panel, in a curved display apparatus according to an exemplary embodiment of the present disclosure.

As illustrated in FIG. 8A, according to an embodiment, the first stress reducing layer S1 is formed on the lower surface of the upper panel 110 and the second stress reducing layer S2 is formed on the upper surface of the lower panel 120.

Figure 8B:
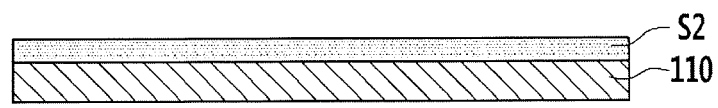
Figure 8B:
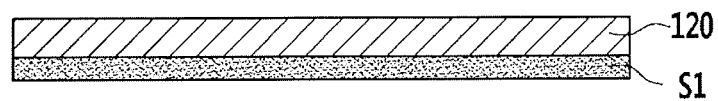

As illustrated in FIG. 8B, according to an embodiment, the second stress reducing layer S2 is formed on the upper surface of the upper panel 110 and the first stress reducing layer S1 is formed on the lower surface of the lower panel 120.

Figure 8C:
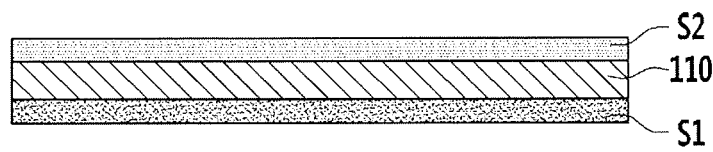
Figure 8C:
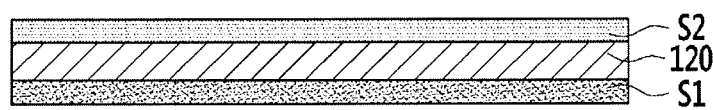

As illustrated in FIG. 8C, according to an embodiment, the second stress reducing layer S2 is formed on the upper surfaces of the upper panel 110 and the lower panel 120 and the first stress reducing layer S1 is formed on the lower surfaces of the upper panel 110 and the lower panel 120.

Figure 8D:
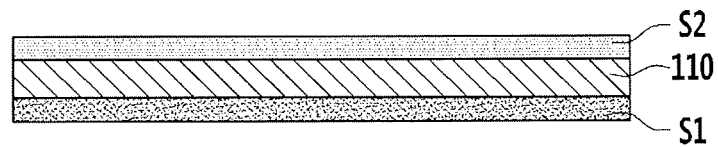
Figure 8D:
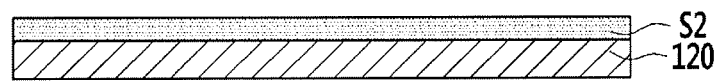

As illustrated in FIG. 8D, according to an embodiment, the second stress reducing layer S2 is formed on the upper surfaces of the upper panel 110 and the lower panel 120 and the first stress reducing layer S1 is formed on the lower surface of the upper panel 110.

Figure 8E:
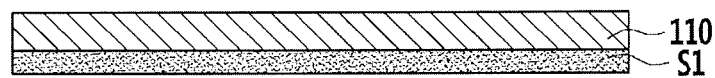
Figure 8E:
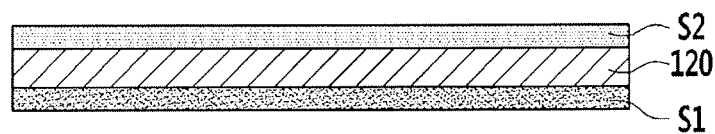

As illustrated in FIG. 8E, according to an embodiment, the second stress reducing layer S2 is formed on the upper surface of the lower panel 120 and the first stress reducing layer S1 is formed on the lower surfaces of the upper panel 110 and the lower panel 120.

Figure 8F:
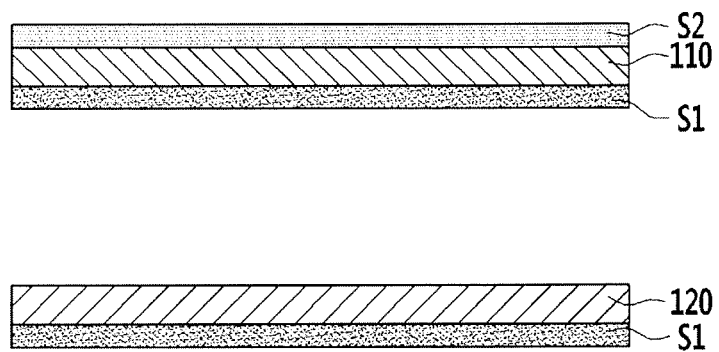

As illustrated in FIG. 8F, according to an embodiment, the second stress reducing layer S2 is formed on the upper surface of the upper panel 110 and the first stress reducing layer S1 is formed on the lower surfaces of the upper panel 110 and the lower panel 120.

Figure 8G:
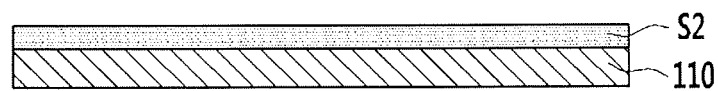
Figure 8G:
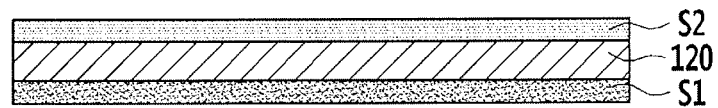

As illustrated in FIG. 8G, according to an embodiment, the second stress reducing layer S2 is formed on the upper surfaces of the upper panel 120 and the lower panel 120 and the first stress reducing layer S1 is formed on the lower surface of the lower panel 110.

The curved display apparatus 300 as shown in FIG. 5 according to an exemplary embodiment having the foregoing structure includes the first stress reducing layer S1 or the second stress reducing layer S2. According to an exemplary embodiment of the present disclosure, the first stress reducing layer S1 or the second stress reducing layer S2 can maintain a bent state and reduce the tendency of the upper and lower panels 110 and 120 of returning to a flat state. As a result, stress applied to the seal bonding between the upper and lower panels 110 and 120 can be reduced to prevent lifting of the upper and lower panels 110 and 120 or leakage of the liquid crystal material.

Hereinabove, several exemplary embodiments have been described but the accompanying drawings and the detailed description are only an example of exemplary embodiments of the present disclosure, and are used to describe exemplary embodiments present disclosure but not to limit the meaning or the scope described in the appended claims. Therefore, it will be appreciated to those skilled in the art that various modifications are made and other equivalent embodiments are available. Accordingly, the actual technical protection scope must be determined by the technical spirit of the appended claims.

What is claimed is:

1. A curved display apparatus, comprising:
an upper panel;
a lower panel coupled to a lower portion of the upper panel; and
a first stress reducing layer deposited on a panel-facing surface of at least one of the upper panel and the lower panel to generate a force that bends the upper panel and the lower panel downward, wherein:
the first stress reducing layer is deposited with a reaction gas, and
the reaction gas is a mixture of ammonia $NH_3$, monosilane $SiH_4$, and nitrogen $N_2$.

2. The curved display apparatus of claim 1, wherein:
the first stress reducing layer is deposited at a first deposition speed, and
the first deposition speed is greater than or equal to 70 Å/sec.

3. A curved display apparatus, comprising:
an upper panel;
a lower panel coupled to a lower portion of the upper panel; and
a second stress reducing layer deposited on an outward-facing surface of any one of the upper panel and the lower panel to generate a force which depresses the upper panel or the lower panel downward,
wherein the second stress reducing layer is deposited with a reaction gas, and
the reaction gas is a mixture of ammonia $NH_3$, monosilane $SiH_4$, and nitrogen $N_2$.

4. The curved display apparatus of claim 3, wherein:
the second stress reducing layer is deposited at a second deposition speed, and
the second deposition speed is less than or equal to 20 Å/sec.

5. A curved display apparatus, comprising:
an upper panel;
a lower panel coupled to a lower portion of the upper panel;
a first stress reducing layer deposited on a lower surface of at least one of the upper panel and the lower panel to generate a force which bends the upper panel and the lower panel downward; and
a second stress reducing layer deposited on an upper surface of at least one of the upper panel and the lower panel to generate a force which depresses the upper panel and the lower panel downward,
wherein each of the first stress reducing layer and the second stress reducing layer is deposited with a reaction gas, and
the reaction gas is a mixture of ammonia $NH_3$, monosilane $SiH_4$, and nitrogen $N_2$.

6. The curved display apparatus of claim 5, wherein:
the first stress reducing layer is deposited at a first deposition speed, and
the first deposition speed is greater than or equal to 70 Å/sec.

7. The curved display apparatus of claim 5, wherein:
the second stress reducing layer is deposited at a second deposition speed, and
the second deposition speed is less than or equal to 20 Å/sec.

8. The curved display apparatus of claim 5, wherein
the first stress reducing layer is deposited on the lower surface of the upper panel, and
the second stress reducing layer is deposited on the upper surface of the lower panel.

9. The curved display apparatus of claim 5, wherein

The first stress reducing layer is deposited on the lower surface of the lower panel, and the second stress reducing layer is deposited on the upper surface of the upper panel.

10. The curved display apparatus of claim 5, wherein the first stress reducing layer is deposited on the lower surface of the upper panel, and the second stress reducing layer is deposited on the upper surface of the upper panel.

11. The curved display apparatus of claim 5, wherein the first stress reducing layer is deposited on the lower surface of the upper panel, and the second stress reducing layer is deposited on the upper surface of the lower panel and the upper surface of the upper panel.

12. The curved display apparatus of claim 5, wherein the first stress reducing layer is deposited on the lower surface of the upper panel and the lower surface of the lower panel, and the second stress reducing layer is deposited on the upper surface of the lower panel.

13. The curved display apparatus of claim 5, wherein the first stress reducing layer is deposited on the lower surface of the lower panel, and the second stress reducing layer is deposited on the upper surface of the lower panel.

14. The curved display apparatus of claim 5, wherein the first stress reducing layer is deposited on the lower surface of the lower panel and the lower surface of the upper panel, and the second stress reducing layer is deposited on the upper surface of the lower panel.

15. The curved display apparatus of claim 5, wherein the first stress reducing layer is deposited on the lower surface of the lower panel, and the second stress reducing layer is deposited on the upper surface of the lower panel and the upper surface of the upper panel.

16. The curved display apparatus of claim 5, wherein the first stress reducing layer is deposited on the lower surface of the lower panel and the lower surface of the upper panel, and the second stress reducing layer is deposited on the upper surface of the lower panel and the upper surface of the upper panel.

* * * * *